(No Model.)  2 Sheets—Sheet 1.

J. T. SLOCOMB.
BICYCLE.

No. 349,532. Patented Sept. 21, 1886.

Witnesses
S. N. Piper
T. B. Torrey

Inventor
John T. Slocomb
by R. H. Eddy att'y (No Model.) 2 Sheets—Sheet 2.

J. T. SLOCOMB.
BICYCLE.

No. 349,532. Patented Sept. 21, 1886.

Witnesses.
S. N. Piper
H. B. Torrey

Inventor
John T. Slocomb.
by R. Kidd att'y

N. PETERS. Photo-Lithographer, Washington, D. C.

UNITED STATES PATENT OFFICE.

JOHN TIBETS SLOCOMB, OF HYDE PARK, MASSACHUSETTS.

BICYCLE.

SPECIFICATION forming part of Letters Patent No. 349,532, dated September 21, 1886.

Application filed July 19, 1886. Serial No. 208,346. (No model.)

*To all whom it may concern:*

Be it known that I, JOHN TIBETS SLOCOMB, of Hyde Park, in the county of Norfolk, of the Commonwealth of Massachusetts, have invented a new and useful Improvement in Bicycles; and I do hereby declare the same to be described in the following specification and represented in the accompanying drawings, of which—

Figure 1:
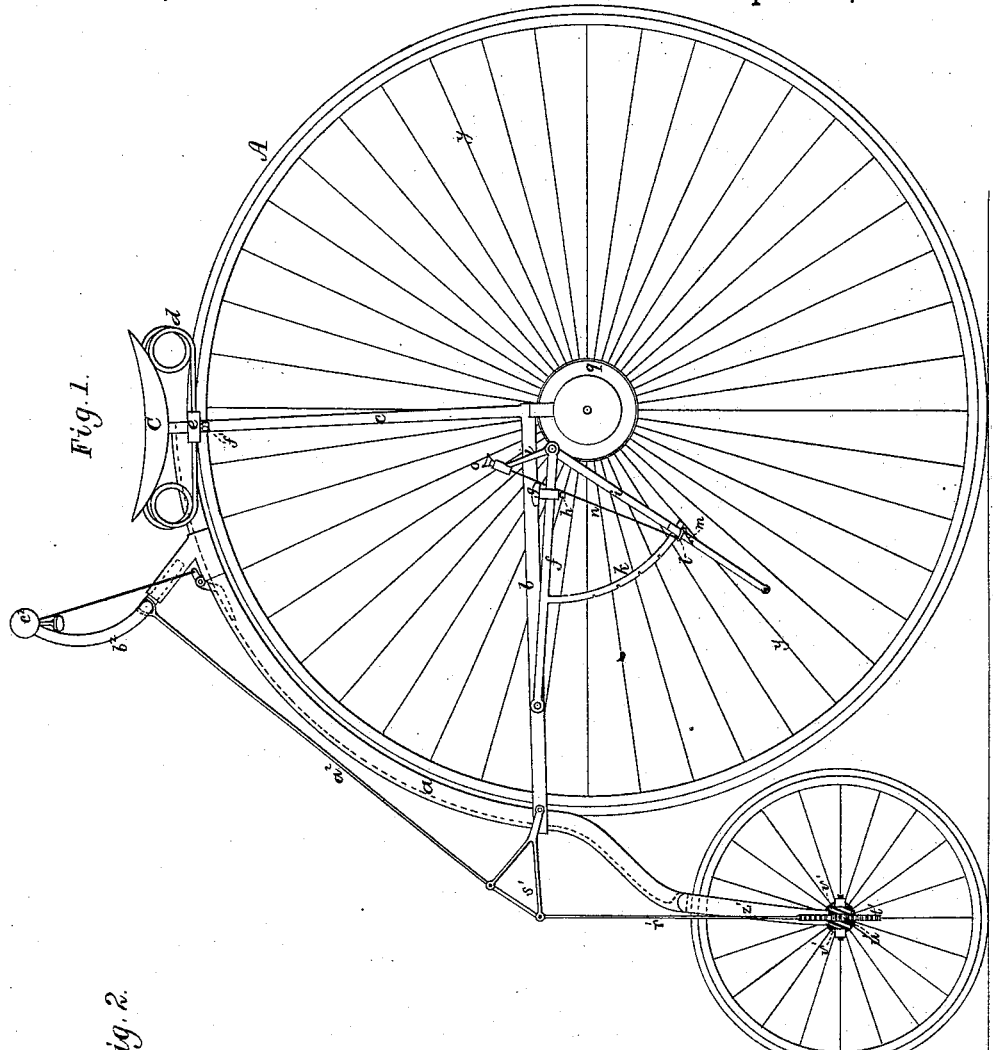
Figure 2:
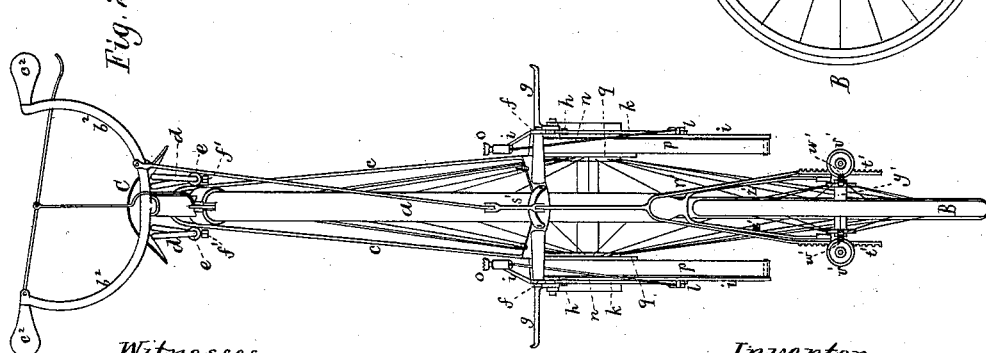
Figure 3:
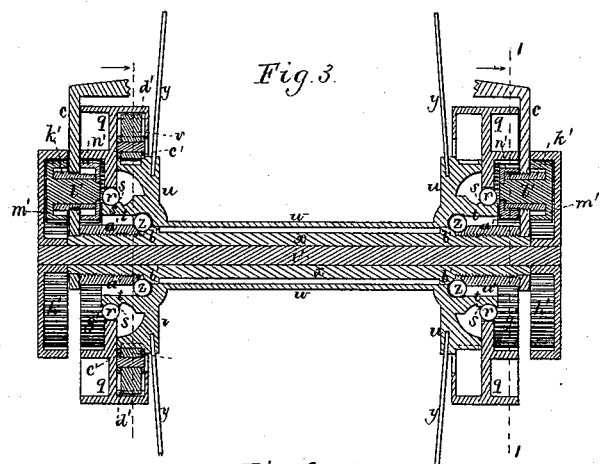
Figure 4:
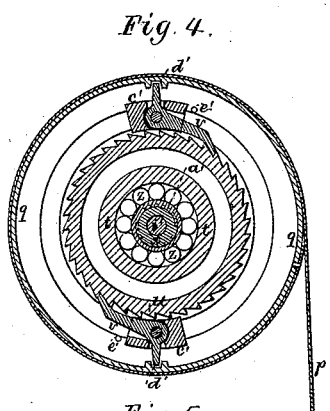
Figure 6:
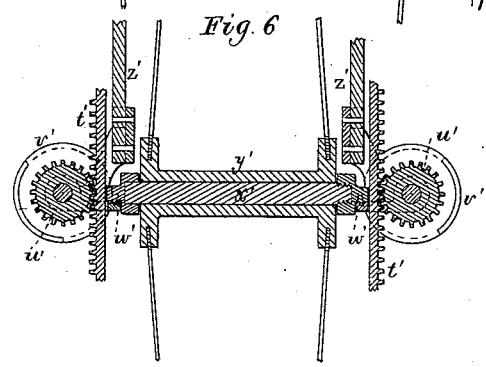
Figure 5:
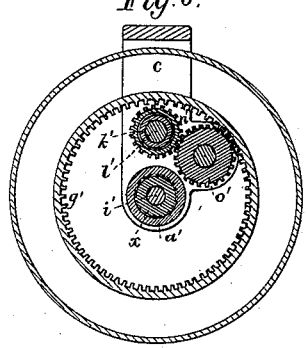
Figure 7:
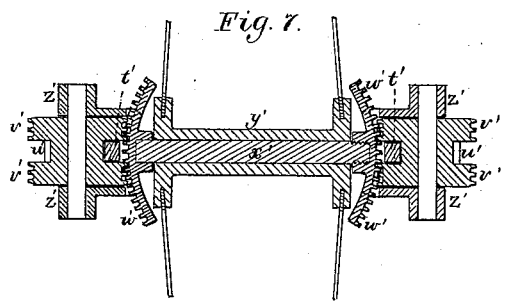

Figure 1 is a side elevation, and Fig. 2 a front view, of a bicycle provided with my invention, the nature of which is defined in the claims hereinafter presented. Fig. 3 is a longitudinal section (on an enlarged scale) taken through the axis of the main-wheel axle and its adjacent mechanism for turning such main wheel. Fig. 4 is a transverse section taken through one of the ratchet-wheels and its operative pawls employed for revolving the main wheel. Fig. 5 is a transverse section taken through line 1 1 of Fig. 3. Fig. 6 is a vertical and longitudinal section, and Fig. 7 a horizontal section, of the axle and hub and mechanism for turning laterally the steering-wheel or varying the position of the plane of it relatively to that of the main wheel.

In this bicycle the steering-wheel B is in front of the main wheel A. The frame for sustaining the two wheels consists of a furcated bar, $a$, and two arched bars, $b$ and $c$, extending therefrom, as represented, and spanning the main wheel.

The seat or saddle (shown at C) is supported by two springs, $d$, each of which consists of a rod of steel bent spirally in each half of it, and being straight between the two spirals, as represented. The straight middle portion of each spring slides through one of the stationary tubes $e$, projecting from the arch $c$. A set-screw, $f'$, is screwed upward within each tube at its middle and against the straight part of the spring. Such means of supporting the seat not only affords to it the necessary spring or elasticity, but renders it capable of being adjusted or moved either backward or forward relatively to the axis of the wheel, as circumstances may require. To each leg of the fork or arched bar $b$ there is pivoted an arm, $f$, provided with a foot-rest, $g$, which slides or is adjustable lengthwise on the arm and is held thereto by a set-screw, $h$. To the inner end of each arm $f$ an obtuse angular lever, $i$, is fulcrumed. A curved or arcal bar, $k$, having a series of notches in its outer periphery, extends downward from the arm $f$ through the longer arm of the lever $i$. To said arm a pawl or catch, $l$, to engage with any one of the notches, is pivoted, such pawl or catch having a spring, $m$, to force it into the notch. To the pawl or catch a rod, $n$, is jointed, such rod being extended upward and loosely through the shorter or upper arm of the lever $i$ and there furnished with a head or knob, $o$. A belt or band, $p$, is fixed at one end to the lower part of the longer arm of such lever $i$, such band going upward and around and being fixed to the periphery of an annular pulley, $q$. Such pulley $q$ revolves on a series of balls, $r$, resting in an annular groove, $s$, formed in and around the periphery of the hub $t$ of a ratchet-wheel, $u$. The pulley $q$ carries two pawls, $v$, to engage with the teeth of the ratchet-wheel. (See Fig. 4.) The two ratchet-wheels $u$ are connected by a sleeve or tube, $w$, within and concentric of which is a tubular shaft, $x$, that at its ends is joined to the two legs or prongs of the arched rod $c$. The spokes of the main wheel at their inner ends are fixed in the two ratchet-wheels $u$, (see Fig. 3,) in which parts of the spokes are shown at $y$. Each ratchet-wheel $u$ is supported on a series of balls, $z$, arranged around the hollow shaft $x$, and held in place thereon by a sleeve, $a'$, screwed thereon, and by a shoulder, $b'$, formed on such shaft. Furthermore, each pawl $v$ is an angular lever pivoted to and extending, as shown, through one of two blocks, $c'$, (see Fig. 4,) placed between the pulley $q$ and the ratchet-wheel $u$, the shorter arm of the pawl extending into a notch, $d'$, in the inner periphery of the annular pulley. At a short distance in front of one block there is in the pulley a pin or shoulder, $e'$, another such pin or shoulder $e'$ being placed in the pulley at a like distance from the rear end of the other block. (See Fig. 4.) In turning in one direction the pulley will force the pawls into engagement with the ratchet-wheel; but when the pulley revolves the opposite way to wind the band upon it the pawls will not only be thrown out but kept out of engagement with the ratchet-wheel or contact with its teeth, so as not to make a clicking noise in passing around them. At starting back, the pulley, in consequence of the inertia and friction of the blocks, will force the pawls out of engagement with the ratchet-wheel, the blocks remaining at rest in the meantime relatively to the ratchet-wheel. As soon, however, as the pins $e'$ are carried against the blocks, the latter will be moved with the pulley about the ratchet-wheel, the pawls being kept out of engagement therewith while such movement is going on. When a rider is astride of the seat, his feet are to rest on the pedals or foot-rests $g$, and he is to alternately force them downward. In descending, each foot-rest $g$ will depress its arm $f$, and with it its lever $i$, whereby the pawl-pulley connected with such lever by a band, $p$, will be partially revolved, and by the action of the pawls upon their ratchet-wheel the main wheel will be revolved. In the meantime the other pawl-pulley will be revolved in the reverse direction, so as to cause it to turn on its ratchet-wheel, and by means of its band raise the other foot-rest.

From the above it will be seen that there are to the main wheel two ratchet-wheels, $u$, which are united by the tube $w$, and that such ratchet-wheels revolve together on two series of balls $z$, encompassing the hollow shaft $x$, fastened to the arched rod $c$; furthermore, that encompassing each ratchet-wheel is an annular pulley, $q$, which also turns on another series of balls, $r$, supported by and extending around the hub $t$ of the ratchet-wheel; that within each pulley $q$ are two pawls to operate the ratchet-wheel encompassed by such pulley. Besides all this, there is mechanism which, while each foot-rest is being depressed and both ratchet-wheels are being, in consequence thereof, simultaneously revolved, causes the other foot-rest to be correspondingly elevated, and its pawl-pulley to be turned backward upon its ratchet-wheel far enough for the pawls of such pulley to engage with their ratchet-wheel preparatory to the next depression of the latter foot-rest. This mechanism may be thus described: Each pulley $q$ has concentric with it and projecting from its outer side an internal gear, $g'$. (See Fig. 3.) Aside of each of said gears is another, $h'$. Both gears $h'$ are fastened to and connected by a shaft, $i'$, which goes through the shaft $x$, secured to the prongs of the arched bar $c$. Extending through each of the said prongs, and secured thereto at its middle, is a sleeve, $k'$, that serves as a bearing for a short shaft, $l'$, having fixed upon it a pair of gears, $m'$ $n'$. Each gear $m'$ engages with the gear $h'$, within which it is situated. One fellow gear, $n'$, within one internal gear, $g'$, engages therewith; but the corresponding fellow gear $n'$ does not directly engage with its internal gear, $g'$, but meshes into an auxiliary gear, $o'$, pivoted to the next adjacent leg or prong of the arched bar $c$, and engaging with the last-mentioned internal gear, $g'$. From the above it will be seen that while one foot-rest is being depressed its pulley $q$ will be partially revolved, and that its internal gear, $g'$, will revolve the pair of gears $m'$ $n'$ in connection with it, and the gear $h'$ will therefore be turned forward simultaneously with the gear $g'$. In turning, the gear $h'$ will simultaneously turn the shaft $i'$, which will turn the other gear $h'$, which will revolve the next contiguous pair of gears, $m'$ $n'$. As the latter gear, $n'$, engages with the auxiliary gear $o'$, and the latter with its internal gear, $g'$, (see Fig. 5,) the pawl-pulley $q$ thereof will be revolved backward—that is, in the opposite direction to what the other pulley $q$ may be in revolution. While either foot-rest is being depressed the other will be raised a like distance, each depression producing a revolving movement of the main wheel A without any "dead-points" to be overcome, as are incident to cranks when used to propel the main wheel. The more the angle of the longer arm of the lever $i$ with the arm $f$ over it is diminished the greater will be the leverage exerted to turn the main wheel, so that when a rider in going uphill with the bicycle finds it necessary to increase such leverage he should put his foot upon and depress the rod $n$, so as to throw the catch $l$ out of engagement with the arc $k$. Next he is to move the longer arm of the lever $i$ on the arc $k$ nearer the arm $f$, and when the proper angular distance is obtained with respect to the arm $f$ and the said longer arm the latter is to be locked in position by the catch $l$ being forced into a notch of the arc $k$.

The next part of the bicycle to be described is the mechanism for turning the steering-wheel B obliquely relatively to the main wheel A. A fork, $r'$, suspended from and jointed to a bell-crank, $s'$, pivoted to the part $a$, has to each of its prongs a toothed rack, $t'$. These racks engage with pinions $u'$, each of which is between and fixed to a pair of worms, $v'$. Each pair of such worms or screws engages with one of two curved racks, $w'$, supported by the prongs $z'$ of the part $a$. These racks are connected by a shaft, $x'$, going lengthwise through the hub $y'$ of the wheel. (See Figs. 6 and 7.) The bell-crank $s'$ is connected by a rod, $a^2$, with a curved lever, $b^2$, having handles $c^2$, and fulcrumed to the bar $a$, all being as represented. By turning such curved lever the racks $t'$ may be raised or depressed, so as to cause the worms to be revolved and the steering-wheel to be moved more or less obliquely relatively to the main wheel.

In the above-described bicycle I claim as my invention—

1. The combination, with each foot-rest-carrying arm $f$, pivoted to the fork $b$, and with the pawl-pulley $q$ and its operative band $p$, of the lever $i$ and the areal notched bar $k$, its catch $l$, and the rod $n$, all being arranged substantially and for use as set forth.

2. The combination, with the seat C and the arched bar $c$, of the springs $d$, adapted to slide in tubular bearings $e$, fixed to the arched bar and provided with set-screws, as represented.

3. The combination, substantially as described, for revolving the main wheel by means of bands attached to levers movable by the feet of the rider, as explained, such combination consisting of the two ratchet-wheels $u$, their connecting-tube $w$, the internal shafts, $i'$ and $x$, the two pawl-pulleys $q$ and their pawls, the four internal gears, $g'$ and $h'$, and the five gears $m'$ $m'$ $n'$ $n'$ $o'$, all arranged and applied essentially and to operate as specified.

4. The combination of the sleeves $a'$, screwed upon the shaft $x$, with such shaft and the two connected ratchet-wheels and their two supporting series of balls, $z$, all being arranged substantially as set forth.

5. The combination, with each of the ratchet-wheels $u$ and its surrounding operative pulley $p$, and the pawls $v$, applied to the latter, as set forth, of the slide-blocks $c'$, to which the pawls are fulcrumed, and the stops or pins $e'$, extending from the wheel, all being arranged substantially as represented.

6. The combination, essentially as described, for moving the steering-wheel into positions oblique to the main wheel, such combination consisting of the hand-lever $b^2$, rod $a^2$, bell-crank $s'$, fork $r'$, racks $t'$, gears $u'$, worms $v'$, curved racks $w'$, and their connecting-shaft $x'$, applied to the wheel-shaft $y'$, all being arranged and to operate substantially as set forth.

JOHN TIBETS SLOCOMB.

Witnesses:
R. H. EDDY,
R. B. TORREY.